United States Patent [19]

Tomka

[11] Patent Number: 5,705,536
[45] Date of Patent: Jan. 6, 1998

[54] FOAMED STARCH POLYMER

[75] Inventor: Ivan Tomka, Bourguillon, Switzerland

[73] Assignee: Bio-Tec Biologische Naturverpackungen GmbH, Emmerich, Germany

[21] Appl. No.: 586,859

[22] PCT Filed: Jun. 15, 1994

[86] PCT No.: PCT/EP94/01946

§ 371 Date: Jun. 27, 1996

§ 102(e) Date: Jun. 27, 1996

[87] PCT Pub. No.: WO95/04104

PCT Pub. Date: Feb. 9, 1995

[30] Foreign Application Priority Data

Jul. 28, 1993 [CH] Switzerland ............... 2280/93

[51] Int. Cl.⁶ ........................................... C08J 9/04
[52] U.S. Cl. ................. 521/84.1; 106/122; 521/79; 521/81; 264/53
[58] Field of Search .............. 521/84.1, 79, 81; 106/122; 264/53

[56] References Cited

U.S. PATENT DOCUMENTS

| | | |
|---|---|---|
| 4,377,440 | 3/1983 | Gasland ............... 162/101 |
| 4,506,037 | 3/1985 | Suzuki et al. ............... 521/84.1 |
| 5,208,267 | 5/1993 | Neumann et al. . |
| 5,308,879 | 5/1994 | Alamatu et al. ............... 521/84.1 |
| 5,360,586 | 11/1994 | Wyatt et al. ............... 521/84.1 |
| 5,589,518 | 12/1996 | Bastioli et al. ............... 521/84.1 |
| 5,602,188 | 2/1997 | Nakanishi ............... 521/84.1 |

FOREIGN PATENT DOCUMENTS

| | | |
|---|---|---|
| 0376201 | 7/1990 | European Pat. Off. . |
| 4008862 | 4/1991 | Germany . |

*Primary Examiner*—Morton Foelak
*Attorney, Agent, or Firm*—Ostrolenk, Faber, Gerb & Soffen, LLP

[57] ABSTRACT

In order to produce a substantially biologically degradable polymer foam, a thermoplastic or disaggregated starch or a polymer mixture of thermoplastic or disaggregated starch with at least one biologically degradable hydrophobic polymer is used. In addition, the material is mixed with a biologically degradable fibrous or capsular material capable of binding water by capillary action, said material being at least partially treated or saturated with water before being mixed with the polymer. The polymer/material mixture thus obtained is processed under controlled pressure and temperature so that the water bound by capillarity in the material is released and causes the polymer to foam.

23 Claims, No Drawings

FOAMED STARCH POLYMER

The present invention relates to a process for producing a substantially biologically degradable polymer foam, a process for the production of a polymer mixture suitable for the production of the biologically degradable polymer foam, a biologically degradable polymer foam and uses of the biologically degradable polymer foam.

The production of foamed polymers is a known process and is effected either mechanically without pressure or by means of foam-forming agents or else by sudden expansion of gases, expansion agents, or solvents which, at higher pressures, produce an inflation pressure in the plastic or liquid polymer composition.

Such polymer foams have the most varied uses in, among other things, packaging, thermal insulation, acoustic insulation, construction and many fields of use of daily life. As is generally the case with polymers or plastics, disposal or degradability constitutes an important factor also in the case of foamed materials, particularly if the foamed materials have a high strength and compressing is not readily possible.

For this reason, a number of foamed substances of so-called biologically degradable polymers are known such as, for instance, starch foamed materials, in connection with which, starting from, for instance, native or so-called disaggregated starch, such a foamed material is produced by means of an expansion agent. Thus for almost a century a sponge made from starch has been known which is produced in the manner that a boiled starch paste is cooled to temperatures below the freezing point and the water then removed from the sponge mass by thawing.

In Federal Republic of Germany 23 04 736, a process for the production of a foamed material is described in which carbohydrates or polysaccharides in granulated, compacted or coarsely crystalline form are heated until dry in a tunnel furnace for 10–40 minutes at 200° to 400° C. with the addition of small amounts of organic or inorganic acids or acid salts. Due to the pyrolysis of the carbohydrate material which takes place, inflation occurs, whereby a carbonated foam material is obtained.

In Federal Republic of Germany 32 06 751, a relatively rigid foam is obtained by an extrusion process in which heating of the starch material is effected already in an extruder due to the shearing forces and the pressure, inflation and foaming of the emerging gelating starch taking place due to the development of gas upon the reaction of expansion agent additives with simultaneous solidification of the starch paste. As expansion agent additives, calcium carbonate and phosphoric acid are described, whereby carbon dioxide is produced.

WO 91/02023 describes a starch foam containing starch and ethylene acrylic copolymer which is obtained by adding an expansion agent such as sodium bicarbonate in the presence of a polymeric acid. Once again, carbon dioxide is the expansion gas.

In WO 91/18048, a nucleating agent is applied to granules of starch. The nucleating agent is decomposed by heat, whereupon the development of the foam commences. As nucleating agent, carbonates enter into consideration, so that once again carbon dioxide is the responsible expansion agent.

Starch foam can however also be produced in the manner, for instance, that powdered starch is mixed with water, this mass is extruded and upon the extrusion the starch is inflated by the steam which is produced.

All such starch foams of this type which have been described are, as a rule, partially or completely biologically degradable, in which connection, of course, the degradability can be negatively influenced by the addition of synthetic additives or plastic additives. Furthermore, it has been found that by the introduction of water as expansion agent or by the use of carbon dioxide as expansion gas, a foaming of the starch can be effected, but a non-uniform cell structure is established which, in its turn, requires additional additives. Furthermore, the required percentage of expansion agent or water necessary to produce the corresponding steam is very high and amounts up to about 20%.

The use of water in combination with the starch furthermore has other disadvantages which can be recognized in particular in connection with the development of so-called thermoplastic starch, which disadvantages are described in detail in a number of publications such as international patent application WO 90/05161 as well as the article "Sorption Behavior of Native and Thermoplastic Starch" by R. M. Sala and I. A. Tomka, in Die angewandte makromolekulare Chemie 199:45–63, 1992; as well as ETH Dissertation No. 9917 by R. M. Sala, 1992, ETH Zurich.

As a result thereof, it would be advantageous to use thermoplastic starch or polymer blends containing thermoplastic starch and, for instance, polycaprolactone as basis for the production of a starch foam. Since water which is bound in the starch does not enter into consideration for the production of such a foam, ordinary physical or chemical expansion agents are necessary, which make the advantage of the biological degradability of pure thermoplastic starch and its blends questionable or do not represent naturally growing resources. Furthermore, a number of naturally occurring expansion agents are compatible with the thermoplastic starch or are thermally unstable or increase the thermal degradation of the thermoplastic starch.

One object of the present invention is therefore to propose a biologically degradable polymer foam which has the most uniform possible cell structure of low density, very good mechanical properties and the greatest possible resistance to water. In accordance with the invention, this object is achieved by a process preferably characterized by the fact that thermoplastic or disaggregated starch or a polymer mixture of thermoplastic or disaggregated starch with at least one biologically degradable hydrophobic polymer is mixed with a biologically degradable fibrous or capsular material which is capable of binding water by capillary action and which is at least partially treated with water, and the polymer/material mixture is foamed by applying such pressure and temperature that the water bound by capillary action in the material is liberated so as to effect the foaming of the polymer.

A method is proposed for the production of a substantially biologically degradable polymer foam, starting from thermoplastic or disaggregated starch or from a polymer mixture consisting of thermoplastic or disaggregated starch with at least one other biologically degradable hydrophobic polymer. The starch or starch mixture is first of all mixed with a biologically degradable fibrous or capsular material which has the ability to bind water by capillary action and which is at least partially treated or substantially fully saturated with water. The biologically degradable/material mixture thus produced can be either isolated and, for instance, granulated so as to be subsequently processed stepwise in a separate process, or else, be directly processed, with pressure and temperature control, in such a manner that the water bound by capillary action in the material is released so as to effect a foaming of the polymer. The great advantage of introducing water as expansion agent by means of the fibrous or capsular materials is that, due to the binding of water by capillary action, undesired interactions with the polymer matrix can be avoided. Furthermore, the ratio of total-water to amount of expansion agent can in this way be kept very low, namely at less than 0.1 wt. %, referred to the total weight of the starch/material mixture.

In order to achieve the excellent physical and/or mechanical properties of thermoplastic starch in a starch foam of the invention, one preferably starts from thermoplastic starch or a polymer mixture containing thermoplastic starch in which the content of water in the thermoplastic starch or polymer mixture is less than 5 wt. % and preferably less than 1 wt. %. The thermoplastic starch or polymer mixture can be mixed with up to 30 wt. % of fibrous or capsular material which is treated or saturated with water. It is essential, upon the mixing of the polymer or the polymer mixture with the material treated with water that the process parameters such as pressure and temperature do not reach values which lead to the liberation of the capillarily bound water and/or the expansion agent. As a rule therefore, the mixing of the thermoplastic starch or the polymer mixture with the material which has been treated with water takes place, for instance in an extruder, in a temperature range of about 100° C. to 200° C., this temperature range or the optimal temperatures to be selected depending on the plasticizing or swelling agent in the starch and thus on the melt viscosity of the starch.

As fibrous or capsular materials the following fibers enter into consideration: hemp, jute, sisal, cotton, flax/linen, natural silk or abaca. So-called ramie fibers also known, for instance, as fibers of so-called China grass have been found to be particular advantageous.

Ramie fiber is frequently also referred to as so-called high-performance fiber directly from nature, since it represents a true alternative to the synthetic industrial fibers. Ramie fibers are therefore frequently also used as reinforcing fibers in view of their high tear strength, low elongation upon rupture, as well as their high adherence. Uses include the strengthening of rubber bands, as reinforcing fiber for building materials such as cement and plaster, as reinforcing fibers for thermosetting polymers, as well as reinforcing fiber for geotextiles.

But ramie fiber has the particular advantage that it is completely decomposable or biologically degradable due to its natural origin.

As fibrous or capsular materials, however, substances such as expanded clay aggregate, silica gel, agarose gel, cephatex gel and ceolith are also suitable.

The thermoplastic starch preferably contains as plasticizing agent or swelling agent one of the following substances: glycerol, sorbitol, pentaerythritol, trimethyl propane, polyvinyl alcohol, amino alcohol, other polyhydric alcohols, mixtures of these components, ethoxylated polyalcohols such as glycerol and ethoxylate or sorbitol and ethoxylate. This list is not limitative and the use of other plasticizing or swelling agents which are suitable for the production of thermoplastic starch is possible, in which connection, as already stated above, water is not suitable.

Instead of thermoplastic starch, one can also use a polymer mixture which contains, among other things, thermoplastic starch and at least one other hydrophobic polymer component such as, for instance, a cellulose derivative having a degree of substitution less than 2, such as cellulose ether, cellulose ester or a cellulose co-ester;

an aliphatic polyester such as polycaprolactone, polyhydroxybutyric acid, polyhydroxybutyric acid/hydroxyvaleric acid copolymer or polylactic acid;

a hydrophobic protein, such as zein; and/or a polyvinyl alcohol prepared by non-one-hundred-percent hydrolyzation of polyvinyl acetate, preferably with a degree of hydrolyzation of about 88%.

As example of a cellulose ether, mention may be made of cellulose diethyl ether (CDE), which can be processed thermoplastically at 190° C. with, for instance, diethyl tartrate as plasticizer, and which cellulose ether is biologically degradable. The maximum water absorption at 20° C. is only just 0.04 parts by weight.

As example of a cellulose ester, mention may be made of cellulose diacetate (CDA) or, as co-ester, cellulose acetate butyrate, which can be processed thermoplastically with plasticizers at 180° C. and which are biologically degradable. The maximum water absorption at 20° C. in water is only just 0.05 parts by weight.

Polycaprolactone can be processed without plasticizer at 120° C.; it is partially crystalline, with a melting point of between 60° C. and 80° C. and a vitreous solidification at −50° C. Its mechanical properties are comparable to those of low-density polyethylene. The maximum water absorption at 20° C. is less than 0.01 parts by weight and, in addition, polycaprolactone is biologically degradable. One great advantage of the use of polycaprolactone is that it is readily miscible with thermoplastic starch without the necessity of using a so-called phase mediator.

Polyhydroxybutyric acid/polyhydroxyvaleric acid copolymers can be processed thermoplastically; they have good mechanical properties and a low water absorption of less than 0.01 parts by weight, and they are furthermore biologically degradable. The same is true of polylactic acid which, although it can be readily processed thermoplastically, has good mechanical properties and is biologically degradable.

As hydrophobic protein, zein, for instance, is proposed, it being capable of being thermoplastically processed with 0.2 parts by weight of lauric acid or diethyl tartrate at 130° C.

Finally, mention should also be made of polyvinyl alcohol, known for instance under the brand name Noviol, in which case the polyvinyl acetate used for its production is preferably 88% hydrolyzed.

Since the thermoplastic starch is hydrophilic and the above-mentioned partners for the production of a polymer mixture are of a hydrophobic character, it is necessary or advantageous as a rule to use for the production thereof a so-called phase mediator which is compatible both with thermoplastic starch and at the same time with the hydrophobic polymer. Due to the different cohesion energy densities of starch and the hydrophobic polymers, block copolymers enter into consideration, namely ones which consist of a block which is soluble in starch and a block which is soluble in the hydrophobic polymer phase. It is, of course, essential in this connection that the phase mediator also be biologically degradable and that it can be suitably processed thermoplastically. As an example thereof, a polycaprolactone/polyvinyl-alcohol copolymer may be mentioned. As phase mediator, however, there also enter into consideration reaction products between a hydrophobic biologically degradable polymer and the thermoplastic starch which are compatible with the hydrophobic polymer phase. In this connection, for instance, the biologically degradable polymer can, for instance, have reactive groups such as, for instance, epoxy groups, or else acid-anhydride groups, which react with at least a part of the thermoplastic starch.

The phase mediator to be used or the quantity thereof to be employed is, in the final analysis, a question of optimalization; it is essential in the case of the polymer mixtures which are to be used for the production of the foam that it be as homogeneous or uniform as possible in order to be able to produce a foam which is also as uniform as possible.

In accordance with a preferred embodiment of the process, thermoplastic starch or the polymer mixture containing thermoplastic starch which has a water content of less than 1 wt. % is mixed with 2–20 wt. %, and preferably about 4–8 wt. %, of water-saturated ramie fiber having a fiber length of about 0.3–4.0 mm in a temperature range of about 130° C. to 170° C. The mixing can take place, for instance, in a single-shaft or co-rotating or counter-rotating twin-shaft extruder or a Kokneader® or else in a batchwise unit such as an internal mixer or "Banbury® mixer". It is important in this mixing process that the water which is bound by capillary action in the ramie fiber not be liberated. On the other hand, however, temperature and pressure as well as the mechanical work introduced must be such that no degradation of the thermoplastic starch takes place. The temperature for the incorporation is furthermore dependent on the swelling agent of plasticizing agent used in the thermoplastic starch, which can greatly affect the melt viscosity of the starch. Thus, for instance in the case of a thermoplastic starch which contains glycerol, lower temperatures are to be used upon the incorporating of the ramie fibers than in the case of thermoplastic starch which contains sorbitol for instance.

Now, it is possible, in principle, to isolate the thermoplastic starch to which ramie fiber has been added or the polymer blend containing thermoplastic starch and to store it as a so-called polymer raw material for the further production of a starch foam in a separate operation or at a later time. The other possibility consists of directly processing the soft compound further, for instance by injection into an injection mold in which case also the molding produced in this manner is, as before, not defoamed.

For the production of the foam, it is now important that the starch compound be processed at elevated temperature and pressure, for instance 200° C. to 210° C., whereby the capillary active water in the ramie fiber is released so as to foam the starch. In this connection, it is possible to process the starch melt containing the ramie fibers in an extruder at the said temperature of about 200° C., or to extrude or injection mold it, the thermoplastic starch or the polymer mixture foaming upon leaving the die. Or, however, the injection molding which has already been produced can be introduced into a mold and be foamed at elevated temperature and pressure.

In contradistinction to the various starch foams known from the prior art, the foam produced in accordance with the invention, consisting of thermoplastic starch or the polymer mixture containing thermoplastic starch, has an extremely uniform cell structure, a low density, and excellent mechanical properties. The mechanical properties are, of course, also decisively influenced by the presence of the ramie fibers, since, as is known, ramie fibers are capable of substantially improving the mechanical properties of polymers or plastics.

Upon the production of the biologically degradable polymers suitable for foaming such as, for instance, the thermoplastic starch, it is, of course, also possible, and at times also advantageous, to operate with additives such as, for instance additional plasticizing agents, lubricants, softeners, etc. Furthermore, it may be advantageous if the material intended for incorporation which has the water bound therein by capillary action, such as for instance the ramie fibers, be treated on its surface before the incorporation, for instance gummed or degummed, in order to permit better wettability by the polymer. Additives such as fire-proofing agents, coloring substances, etc. can also be used upon the compounding of the polymer or the polymer mixture.

Upon the production of the polymer foam, it must be seen to it, however, when adding additives such as plasticizing agents, lubricants and, in particular, softeners, that the viscosity is not too low. A low viscosity has a negative effect on the production of the foam and in case of too low a viscosity, there is the danger of collapse. Low viscosity on the part of the material to be foamed can, however, also result if the further polymer component used in the polymer mixture in addition to the thermoplastic starch has a very low viscosity and the overall viscosity is low due to too high a proportion of this further component. In general, upon producing a polymer blend for use for the production of a foam in accordance with the invention, it should be seen to it that the viscosity of the thermoplastic starch contained therein is not substantially reduced. Too low a viscosity, however, also results if the water content in the material to be foamed is too high. Finally, too low a viscosity can also be a sign that the thermoplastic starch used in the material to be foamed is too strongly degraded.

The properties of the polymer foam can, however, also be controlled by, for instance, the length of the ramie fibers used, or else by admixing different materials such as, for instance, ramie fibers with cotton fibers in order, for instance, to produce a greater flexibility of the foamed material. The mixing of ramie fibers with, for instance expanded clay aggregate or silica gel, etc. is, for instance, also possible.

The present invention accordingly provides a biologically degradable polymer foam consisting essentially of foamed thermoplastic starch or a foamed thermoplastic polymer mixture which is compounded or treated with a material which is capable of binding water by capillary action. This material can either be a fibrous material such as hemp, jute, sisal, cotton, flax/linen, natural silk, abaca, or preferably ramie fibers, or else a capsular material such as, for instance, expanded clay aggregate, silica gel, agarose gel, Sephatex gel or Ceolith.

The polymer foam defined in accordance with the invention is suitable, inter alia, as packaging material, as thermal or acoustic insulation, or, in general, as absorbing material and for various uses in construction.

The invention will now be explained in further detail with reference to various embodiments.

EXAMPLE 1

One starts from thermoplastic starch which has been prepared by digesting 65% starch with 35% sorbitol. The operation is carried out in a Theysohn TSK 045 Compounder (twin-shaft extruder with shafts rotating in the same direction) with different liquid/solid ratios. The following temperature profile is selected in the extruder:

Zone 1, 25° C.; Zone 2, 130° C.; Zone 3, 150° C.; Zone 4, 170° C.; Zone 5, 150° C.; Zone 6, 140° C.; Zone 7, 140° C.; Zone 8, 170° C.

10 kg/hr of thermoplastic starch granulates are introduced into Zone 1 and melted. In Zone 5, 1500 g/hr of thermoplastic starch, 840 g/hr of ramie fibers having a fiber length of 0.5 mm, and 200 g/hr of stearic acid are furthermore added. The ramie fiber had been pretreated by moistening or substantially saturating with water before its admixture. This was followed by mixing and the removal of the melt and cooling. It should be seen to it in this connection that the material does not foam already upon the compounding, which can be obtained by temperatures which are definitely below 200° C. The following extruder values were selected:

Speed of rotation of extruder: 200 rpm

Torque: 65% of the maximum torque

Mass pressure (die): 4–8 bar

As an alternative to the procedure used in Example 1, one can also start from native starch, in which case the thermoplastic starch is first of all digested by the addition of sorbitol. It should be seen to it in this connection that any moisture present in the native starch is removed by the application of a vacuum. It is essential that the thermoplastic starch have only a low moisture content upon the processing or the incorporating and compounding with the ramie fiber, i.e. that the moisture content is preferably less than 1% by weight.

EXAMPLE 2

The same compounding unit is used as in Example 1. Again, 10 kg/hr of thermoplastic starch (containing 35 wt. % sorbitol) is added in Zone 1 and melted. In Zone 5, there then are added an additional 1500 g/hr of thermoplastic starch as well as 1200 g/hr of ramie fibers having a fiber length of 0.5 mm, as well as 200 g/hr of stearic acid.

Extruder values:

Speed of rotation of the extruder: 200 rpm

Torque: 80% of the maximum torque

Mass pressure (die): 4 bar

Temperature profile compounder:

Zone 1, 25° C.; Zone 2, 130° C.; Zone 3, 150° C.; Zone 4, 170° C.; Zone 5, 130° C.; Zone 6, 120° C.; Zone 7, 120° C.; Zone 8, 160° C.

EXAMPLE 3

As basis in Example 3 there is used native starch which is added in Zone 1 of a similar compounding unit as that used in Examples 1 and 2. In Zone 1, 13.5 kg/hr of starch are added, and in Zone 2 10 kg/hr of sorbitol. This is followed by the digestion of the starch to form thermoplastic starch. The steam produced is drawn off by a vacuum in Zone 4. In Zone 5, 200 g/hr of finished thermoplastic starch as well as 1200 g/hr of ramie fibers having a fiber length of 1 mm as well as 200 g/hr of stearic acid are added. The melt thus produced is removed and granulated.

Extruder values:

Speed of rotation of the extruder: 200 rpm

Torque: 65% of the maximum torque

Mass pressure (die): 40 bar

Temperature profile compounder:

Zone 1, 80° C.; Zone 2, 160° C.; Zone 3, 190° C.; Zone 4, 180° C.; Zone 5, 160° C.; Zone 6, 140° C.; Zone 7, 140° C.; Zone 8, 170° C.

As the temperature profile clearly shows, temperatures of between 160° C. and 190° C. are established in Zones 2 to 4, which temperatures are necessary or preferred in order to digest thermoplastic starch. The temperatures are then reduced to 160° C. or less in order to prevent the emergence of the moisture from the capillaries of the ramie fibers.

Instead of sorbitol, one can, of course, also use pentaerythritol or glycerol or some other suitable plasticizer for the digesting of the thermoplastic starch. Depending on the viscosity of the starch/plasticizer mixture or the thermoplastic starch thus digested which is established, lower temperatures can be selected in Zone 4 and following zones for the incorporating of the ramie fibers.

EXAMPLE 4

All adjustments as in Example 3, only that in Zone 5, 400 g/hr of stearic acid are newly added rather than 200 g/hr.

Extruder values: 200 rpm

Speed of rotation of extruder: 60–65% of the maximum torque

Mass pressure (die): 30–40 bar

EXAMPLE 5

13.5 kg/hr of starch are added in Zone 1 and 10 kg/hr of sorbitol in Zone 2. This is followed by digestion of the starch. Undesired water is removed in Zone 4. 200 g/hr of completely digested thermoplastic starch, 240 g/hr of ramie fibers of a fiber length of 2 mm, and 360 g/hr of a neutral fatty-acid ester as processing aid are added in Zone 5. The melt is withdrawn and granulated.

Extruder values:

Speed of rotation of extruder: 250 rpm

Torque: 55% of the maximum torque

Mass pressure (die):

Temperature profile of extruder:

Zone 1, 80° C.; Zone 2, 160° C.; Zone 3, 190° C.; Zone 4, 180° C.; Zone 5, 170° C.; Zone 6, 160° C.; Zone 7, 160° C.; Zone 8, 170° C.

EXAMPLE 6

The same procedure as in Example 5, only that 470 g/hr of processing aid is added in Zone 5 instead of 360 g/hr.

Extruder values:

Speed of rotation of extruder: 250 rpm

Torque: Lower value than Example 5

Mass pressure (die):

Temperature profile of extruder:

Zone 1, 80° C.; Zone 2, 160° C.; Zone 3, 190° C.; Zone 4, 180° C.; Zone 5, 150° C.; Zone 6, 135° C.; Zone 7, 135° C.; Zone 8, 135° C.

EXAMPLE 7

10 kg/hr of completely digested thermoplastic starch are added in Zone 1, and 160 g/hr of water are added as processing aid in Zone 2. The water is then removed in Zone 4. 2000 g/hr of completely digested thermoplastic starch as well as 2400 g/hr of ramie fibers of a fiber length of 2 mm, and 360 kg/hr of a neutral fatty-acid ester as processing aid are added in Zone 5. The melt is then withdrawn and granulated.

Extruder values:

Speed of rotation of extruder: 200 rpm

Torque: 65% of the maximum value

Mass pressure (die):

Temperature profile of extruder:

Zone 1, 40° C.; Zone 2, 130° C.; Zone 3, 155° C.; Zone 4, 170° C.; Zone 5, 150° C.; Zone 6, 140° C.; Zone 7, 140° C.; Zone 8, 170° C.

EXAMPLE 8

10 kg/hr of completely digested thermoplastic starch are added in Zone 1, and 160 g/hr of water as processing aid in Zone 2. The water is removed in Zone 4. 2000 g/hr of completely digested thermoplastic starch as well as 1200 g/hr of ramie fibers having a fiber length of 1 mm and 360 g/hr of a neutral fatty-acid ester as processing aid are added in Zone 5. Thereupon, the melt is withdrawn and granulated.

Extruder values:

Speed of rotation of extruder: 200 rpm

Torque: 50–55% of the maximum value

Mass pressure (die):

Temperature profile of extruder:

Zone 1, 25° C.; Zone 2, 130° C.; Zone 3, 155° C.; Zone 4, 170° C.; Zone 5, 150° C.; Zone 6, 140° C.; Zone 7, 140° C.; Zone 8, 170° C.

EXAMPLE 9

Basis: Completely digested thermoplastic starch with 33% glycerol; fiber length 0.5 mm, water content of the fiber: 7%.

Temperature profile of compounder:

Zone 1, 100° C.; Zone 2, 180° C.; Zone 3, 180° C.; Zone 4, 150° C.; Zone 5, 120° C.; Zone 6, 120° C.; Zone 7, 120° C.; Zone 8, 170° C.

In Zone 1, 15 kg/hr of thermoplastic starch granulate are added and melted. In addition, 340 g/hr of ramie fibers are added in Zone 4, and 1500 g/hr of thermoplastic starch and 200 g/hr of stearic acid in Zone 5. This is followed by removal of the melt and cooling. It must be seen to it that the material does not foam already upon the compounding (temperature less than 200° C.).

Extruder values:

Speed of rotation of extruder: 150 rpm
Torque: 45% of the maximum torque
Mass pressure (die): 4 bar

EXAMPLE 10

Completely digested thermoplastic starch with 33% glycerol; fiber length 0.5 mm, water content of the fibers: 7%.

Temperature profile of compounder:

Zone 1, 100° C.; Zone 2, 180° C.; Zone 3, 180° C.; Zone 4, 150° C.; Zone 5, 120° C.; Zone 6, 120° C.; Zone 7, 120° C.; Zone 8, 170° C.

20 kg/hr of thermoplastic starch granulate are added in Zone 1 and melted. In addition, 670 g/hr of ramie fibers are added in Zone 4, and 2500 g/hr of thermoplastic starch and 200 g/hr of stearic acid in Zone 5. This is followed by removal of the melt and cooling. Temperatures not more than 200° C.

Extruder values:

Speed of rotation of extruder: 100 rpm
Torque: 55% of the maximum torque
Mass pressure (die): 10 bar

EXAMPLE 11

Completely digested thermoplastic starch with 33% glycerol; fiber length 0.5 mm, water content of the fibers: 7%.

Temperature profile of compounder:

Zone 1, 60° C.; Zone 2, 180° C.; Zone 3, 180° C.; Zone 4, 150° C.; Zone 5, 120° C.; Zone 6, 120° C.; Zone 7, 120° C.; Zone 8, 170° C. 20 kg/hr of thermoplastic starch are added in Zone 1. 1260 g/hr of ramie fibers are added in Zone 4, and 3000 g/hr of thermoplastic starch and 200 g/hr of stearic acid in Zone 5. Granulation.

Extruder values:

Speed of rotation of extruder: 200 rpm
Torque: 50% of the maximum torque
Mass pressure (die): 12 bar

EXAMPLE 12

Polymer blend, consisting of 50% thermoplastic starch (digested with 35% sorbitol and glycerol in a ratio of 1:1) and 50% polycaprolactone; fiber length 0.5 mm, water content of the fibers: 7%.

Temperature profile of compounder:

Zone 1, 60° C.; Zone 2, 180° C.; Zone 3, 180° C.; Zone 4, 120° C. Zone 5, 120° C. Zone 6 120° C.; Zone 7, 120° C.; Zone 8, 150° C.

20 kg/hr of the polymer mixture are added in Zone 1. 1260 g/hr of ramie fibers are added in zone 4.

Extruder values:

Speed of rotation of extruder: 200 rpm
Torque: 50% of the maximum torque
Mass pressure (die): 4.0 bar

EXAMPLE 13

Polymer mixture according to Example 12.

Temperature profile of extruder:

Zone 1, 60° C.; Zone 2, 180° C.; Zone 3, 180° C.; Zone 4, 120° C.; Zone 5, 120° C.; Zone 6, 120° C.; Zone 7, 120° C.; Zone 8, 150° C.

20 kg/hr of a polymer mixture granulate are added in Zone 1. 2100 g/hr of ramie fibers are added in Zone 4. Granulation.

Extruder values:

Speed of rotation of extruder: 200 rpm
Torque: 50% of the maximum torque
Mass pressure (die): 4.0 bar

EXAMPLE 14

In contradistinction to the previously prepared polymer mixtures in which potato starch served as starch basis, completely digested corn thermoplastic starch with 35% sorbitol is used in the present example 14. Fiber length 0.5 mm; water content of the fibers: 7%.

Temperature profile of extruder:

Zone 1, 60° C.; Zone 2, 160° C.; Zone 3, 180° C.; Zone 4, 160° C.; Zone 5, 160° C.; Zone 6, 160° C.; Zone 7, 160° C.; Zone 8, 170° C.

Addition of 15 kg/hr of thermoplastic starch in Zone 1. In addition, 900 g/hr of ramie fibers are added in Zone 4, and 1500 g/hr of completely digested thermoplastic starch and 400 g/hr of stearic acid in Zone 5.

Extruder values:

Speed of rotation of extruder: 200 rpm
Torque: 45% of the maximum torque
Mass pressure (die): 6.0 bar

EXAMPLE 15

Thermoplastic starch similar to Example 14; length of fiber 0.1 mm; water content of the fibers: 7%.

Temperature profile of extruder:

Zone 1, 60° C.; Zone 2, 160° C.; Zone 3, 180° C.; Zone 4, 160° C.; Zone 5, 160° C.; Zone 6, 160° C.; Zone 7, 160° C.; Zone 8, 170° C.

Addition of 15 kg/hr of thermoplastic starch in Zone 1. In Zone 4, in addition, 1800 g/hr of ramie fibers, and in Zone 5 1500 g/hr of thermoplastic starch and 400 g/hr of stearic acid.

Extruder values:

Speed of rotation of extruder: 200 rpm
Torque: 45% of the maximum torque
Mass pressure (die): 10 bar

EXAMPLE 16

Thermoplastic starch similar to Examples 14 and 15; length of fiber 1.0 mm; water content of the fibers: 18%.

Temperature profile of extruder:

Zone 1, 60° C.; Zone 2, 160° C.; Zone 3, 180° C.; Zone 4, 160° C.; Zone 5, 160° C.; Zone 6, 160° C.; Zone 7, 160° C.; Zone 8, 170° C.

In Zone 1, addition of 15 kg/hr of thermoplastic starch. In Zone 4, addition of 1800 g/hr of ramie fibers. In Zone 5, addition of 3000 g/hr of thermoplastic starch and 400 g/hr of stearic acid. Granulation.
Extruder values:
  Speed of rotation of extruder: 200 rpm
  Torque: 50% of the maximum torque
  Mass pressure (die): 6.0 bar

EXAMPLE 17

Pure polycaprolactone; length of fiber 1.0 mm; water content of the fibers: 18%.
Temperature profile of compounder:
  Zone 1, 30° C.; Zone 2, 150° C.; Zone 3, 150° C.; Zone 4, 80° C.; Zone 5, 80° C.; Zone 6, 80° C.; Zone 7, 80° C.; Zone 8, 80° C.
  In Zone 1, addition of 15 kg/hr of polycaprolactone. In Zone 2, addition of 1800 g/hr of ramie fibers, in Zone 5 addition of 5 kg/hr of polycaprolactone.
Extruder values:
  Speed of rotation of extruder: 125 rpm
  Torque: 45% of the maximum torque
  Mass pressure (die): 5.0 bar

EXAMPLE 18

Digested corn thermoplastic starch with 32% sorbitol; length of fiber: 0.5 mm; water content of the fibers: 18%.
Temperature profile of compounder:
  Zone 1, 60° C.; Zone 2, 180° C.; Zone 3, 180° C.; Zone 4, 180° C.; Zone 5, 180° C.; Zone 6, 180° C.; Zone 7, 200° C.; Zone 8, 200° C.
  In Zone 1, addition of 25 kg/hr of thermoplastic starch. In Zone 4, addition of 1830 g/hr of ramie fibers; in Zone 5 addition of 4 kg/hr of thermoplastic starch. In this experiment, foaming was effected directly after the addition of the fibers within the same process.
Extruder values:
  Speed of rotation of extruder: 100 rpm
  Torque: 70–80% of the maximum torque
  Mass pressure (die): 50 bar

EXAMPLE 19

The production was effected now, in contradistinction to the examples indicated above, on a Buss Ko-Kneader (46 mm screw diameter). As base there was used starch and plasticizer (35% sorbitol); length of fiber: 0.5 m/n; water content of the fibers: 7%.
Temperature profile in the Buss kneader:
  Zone 0, 90° C.; Zone 1, 90° C.; Zone 2, 130° C.; Zone 3, 150° C.; Zone 4, 150° C.
  The Buss kneader has 4 heating zones (Zones 1–4); Zone 0 corresponds here to the heatable screw.
  The starch was premixed here with 2.5% ramie fibers (referred to the final product TPS=starch+sorbitol). 13.5 kg/hr starch/fiber mixture and 7 kg/hr sorbitol were added together in Zone 1. This was followed by the plasticizing and then cold granulation.
Kneader values:
  Kneader speed of rotation: 200 rpm
  The specific power consumption is 300 Watt hours/kg
Production of the Polymer Foam Containing Ramie Fibers

EXAMPLE 20

Foam test 1: Material from Example 9 is used.
The foaming is effected on a single-screw extruder of the Collin Company (screw diameter: 45 mm)
Temperature profile of extruder (°C.): 120/160/200/200/200

Foaming was effected by a capillary threaded thereon having a length of 8 mm and a diameter of 1.5 mm.
The pressure reached at the highest speed of rotation (120 rpm) was maximum 70 bar.
The lowest density obtained was 340 kg/m$^3$.

EXAMPLE 21

Foam test 2: Material from Example 16.
The foaming was effected on an Arburg injection molding machine (Type 270M, screw diameter 25 mm).
In this case, extrusion was effected into the open with a circumferential speed of 30 m/min through a die having a diameter of 1 mm.
Temperature profile (° C): 120/180/210/210/210
Density reached: 300 kg/m$^3$.

EXAMPLE 22

Foam test 3: Material from Example 19.
Here, extrusion into the open was effected on the above injection molding machine through a 3 mm die.
Temperature profile (°C.): 90/140/160/200/200
Density reached: 160 kg/m3.

EXAMPLE 23

Foam test 4: Material from Example 18.
The foaming is carried out here in a single process directly on the Theysohn Compounder immediately after the admixing of the ramie fibers (for parameters, see Example 18). The effective temperature of the mass was about 200°–210° C. here. Pressures of up to 50 bar were obtained. The foaming was effected through a capillary of a length of 3 mm and a diameter of 3 mm.
Density reached: 190 kg/m$^3$ The foaming with ramie fibers is determinatively influenced, in addition to a suitable material, by two parameters, namely the pressure and the temperature. In addition, the speed of emergence of the melt or the foam plays a role. One can say, in principle, that with an increase in pressure (up to 300–400 bar) and, in the case of ramie fibers, with lower temperature, the foam obtained has an increasingly lower density. The minimum temperature is, to be sure, limited to about 200° C. since otherwise the water which is stored in the ramie fibers cannot be liberated. The temperature should not exceed 210° C. when using thermoplastic starch since with increasing temperature a degradation of the TPS can take place, which results in an impairment of the foam. Therefore, suitable cooling of the foaming unit must be provided. The pressures obtained with the installations used amounted only up to about 70 bar (ordinary production plants operate with 250–350 bar). The foams produced in this way with ramie fibers all had a density within the range of 160 to 340 kg/m$^3$, which, in comparison with the density of the starting materials within the range of about 1500 kg/m$^3$, nevertheless represents a respectable foaming. With optimized process conditions, nevertheless a clear reduction in the density can still be obtained here.

From the foaming tests carried out, it resulted, furthermore, that it is preferable to operate with a fiber length of about 0.5 to 0.6 mm of the ramie fibers. The proportion of ramie fibers was preferably 4–8 wt. % referred to the total weight of the foam since in the case of saturated ramie fibers and a higher percentage, the amount of water thus resulting in the material to be foamed may be too high, as a result of which the viscosity is greatly reduced due to too high a content of water. Low viscosity upon the production of the foam is, however, as already stated, not desired.

With the foam materials produced in Examples 20–23, compression tests were furthermore carried out. A cylinder of a height of 15 mm was used. The foam material which was introduced into it was pushed in 3 mm, held in inward-pushed condition for 1 minute, and then released, a further minute being waited before measuring the restoration. As comparison with this, a thermoplastic starch containing 31.5 wt. % sorbitol without fibers was used for reference purposes, this thermoplastic starch being foamed with 3.5% water and 0.15 wt. % microtalc (as nucleation agent). Both the four foamed materials used in accordance with Examples 20–23 and the reference foam were conditioned at 70% humidity.

The foamed materials containing ramie fibers gave a restoration of 82–91%, the material in accordance with Example 22 gave a restoration of 87–91%, and the foam in accordance with Example 23 a restoration of 88–91%. As compared with this, the reference foam without ramie fibers gave a restoration of 81–89%.

It is thus shown that the foamed materials produced in accordance with the invention have a somewhat higher compressive strength than the reference foam.

Finally, it may also be pointed out that the foamed materials produced in accordance with Examples 20–23 showed a higher resistance to humidity than the reference foam. This effect is probably due, in particular, to the proportion of ramie fibers in the foam.

The formulas and test conditions of Examples 1–23 are, of course, merely examples serving for the further explanation of the present invention. It is possible, of course, instead of pure thermoplastic starch, to use polymer mixtures which contain thermoplastic starch. In this connection, it should be seen to it, in particular, that the total viscosity of the mixture is not substantially less than the viscosity of the pure thermoplastic starch. Furthermore, it is possible to use, instead of ramie fibers, fillers which on the one hand are biologically degradable and on the other hand have the ability to bind water by capillary action. The basic concept of the invention is that for the foaming of a biologically degradable polymer, instead of expansion agents or free water, one can use a filler which is also biologically degradable and which is capable of binding water by capillary action.

I claim:

1. A process for the production of a substantially biologically degradable polymer foam, characterized by the fact that thermoplastic or disaggregated starch or a polymer mixture of thermoplastic or disaggregated starch with at least one biologically degradable hydrophobic polymer, said starch or polymer mixture having a water content of less than 5 wt % is mixed with a material consisting essentially of a biologically degradable fibrous or capsular material which is capable of binding water by capillary action and which was at least partially treated with water, and the polymer/material mixture is foamed by applying such pressure and temperature that the water bound by capillary action in the material is liberated so as to effect the foaming of the polymer.

2. A process, according to claim 1, characterized by the fact that thermoplastic starch or the polymer mixture containing thermoplastic starch is mixed with up to 30 wt. % of capillary water-containing fibrous or capsular material.

3. A process, according to claim 1, characterized by the fact that the mixing of the thermoplastic starch or the thermoplastic starch/polymer mixture with the fibrous or capsular material is effected within a temperature range of 100°–200° C.

4. A process, according to claim 1, characterized by the fact that the fibrous or capsular material comprises at least one of the following fibers: hemp, jute, sisal, cotton, flax/linen, natural silk and/abaca.

5. A process, according to claim 1, characterized by the fact that the fibrous or capsular material comprises at least one of the following substances: expanded clay aggregate, silica gel, agarose gel, cephatex gel and/Ceolith.

6. A process, according to claim 1, characterized by the fact that the fibrous or capsular material comprises ramie fibers.

7. A process, according to claim 1, characterized by the fact that the polymer mixture contains, in addition to thermoplastic starch, at least one of the following hydrophobic polymers:

cellulose derivative having a degree of substitution less than or equal to 2;

aliphatic polyester;

hydrophobic protein; and polyvinyl alcohol.

8. A process, according to claim 7, characterized by the fact that the polymer mixture comprises a polymeric phase mediator or a macromolecular dispersing agent, the phase mediator or the dispersing agent coupling of the starch phase with the hydrophobic polymer phase.

9. A process according to claim 1, characterized by the fact that the thermoplastically processable starch is starch which has been digested with water removal with at least one of the following substances as swelling or plasticizing agent or as softener:

sorbitol, glycerol, pentaerythritol, trimethyl propane, polyvinyl alcohol, a hydroxy acid or salt thereof, polyvinyl alcohol, and ethoxylated polyalcohol.

10. A process, according to claim 1, characterized by the fact that the thermoplastic starch or a thermoplastic starch/polymer mixture having a water content of less than 1 wt. % is mixed with 2–20 wt. %, of water-saturated ramie fibers having a fiber length of about 0.3–4.0 mm, within a temperature range of about 120°–180° C.

11. A process, according to claim 10, characterized by the fact that for the foaming at a temperature of about 200°–210° C. in order to effect the liberation of the water bound by capillary action in the ramie fiber, which water serves as expansion agent for the inflating of the thermoplastic starch.

12. A process for the production of a polymer mixture suitable for the production of a biologically degradable polymer foam, characterized by the fact that thermoplastic starch or a polymer mixture containing thermoplastic starch and a hydrophobic polymer having a water content of less than 1 wt. % are mixed with up to 30 wt. % of ramie fibers substantially saturated with water at a temperature range of 130–°170° C.

13. A biologically degradable polymer foam, comprising foamed thermoplastic starch containing ramie fibers.

14. A polymer foam, according to claim 13, comprising 3 to 30 wt. % of ramie fibers based on the total weight of the foam.

15. A polymer foam, according to claim 13, characterized by comprising 20 to 35 wt. %, based on the weight of the thermoplastic starch, of glycerol, sorbitol or a mixture thereof as plasticizer, as well as 4–8 wt. % of ramie fibers, referred to the total weight of the foam.

16. A polymer mixture suitable for the production of a biologically degradable polymer foam, characterized by a thermoplastic starch mixture with ramie fibers substantially saturated with water.

17. A polymer mixture according to claim 16, characterized by the fact that the thermoplastic starch is from 20 to 35 wt.% based on the weight of the thermoplastic starch of glycerol, sorbitol or a mixture thereof, and the ramie fibers are 4 to 8 wt. % based on the total weight of the polymer mixture.

18. A polymer mixture according to claim 16, characterized by the fact that it contains at least one hydrophobic polymer.

19. A biologically degradable polymer foam according to claim 13, characterized by the fact that it contains at least one hydrophobic polymer.

20. A process according to claim 2 in which said water content is less than one weight percent and the mixture is effected within a temperature range of 130° C.–170° C.

21. A process according to claim 7, characterized by the fact that the hydrophobic polymer is selected from the group consisting of cellulose ether, cellulose ester, caprolactone, polyhydroxybutyric acid, polyhydroxybutyric acid/hydroxvaleric acid copolymer, polylactic acid, zein and about 88% hydrolyzed polyvinyl acetate.

22. A process according to claim 10 in which the amount of water-saturated ramie fibers is 4–8 wt. percent and said fibers have a fiber length of about 0.4–0.6 mm and the mixing is effected within a temperature range of 130° C.–170° C.

23. A process according to claim 12 in which the amount of ramie fibers is about 4–8 wt. percent.

* * * * *